Figure 1:
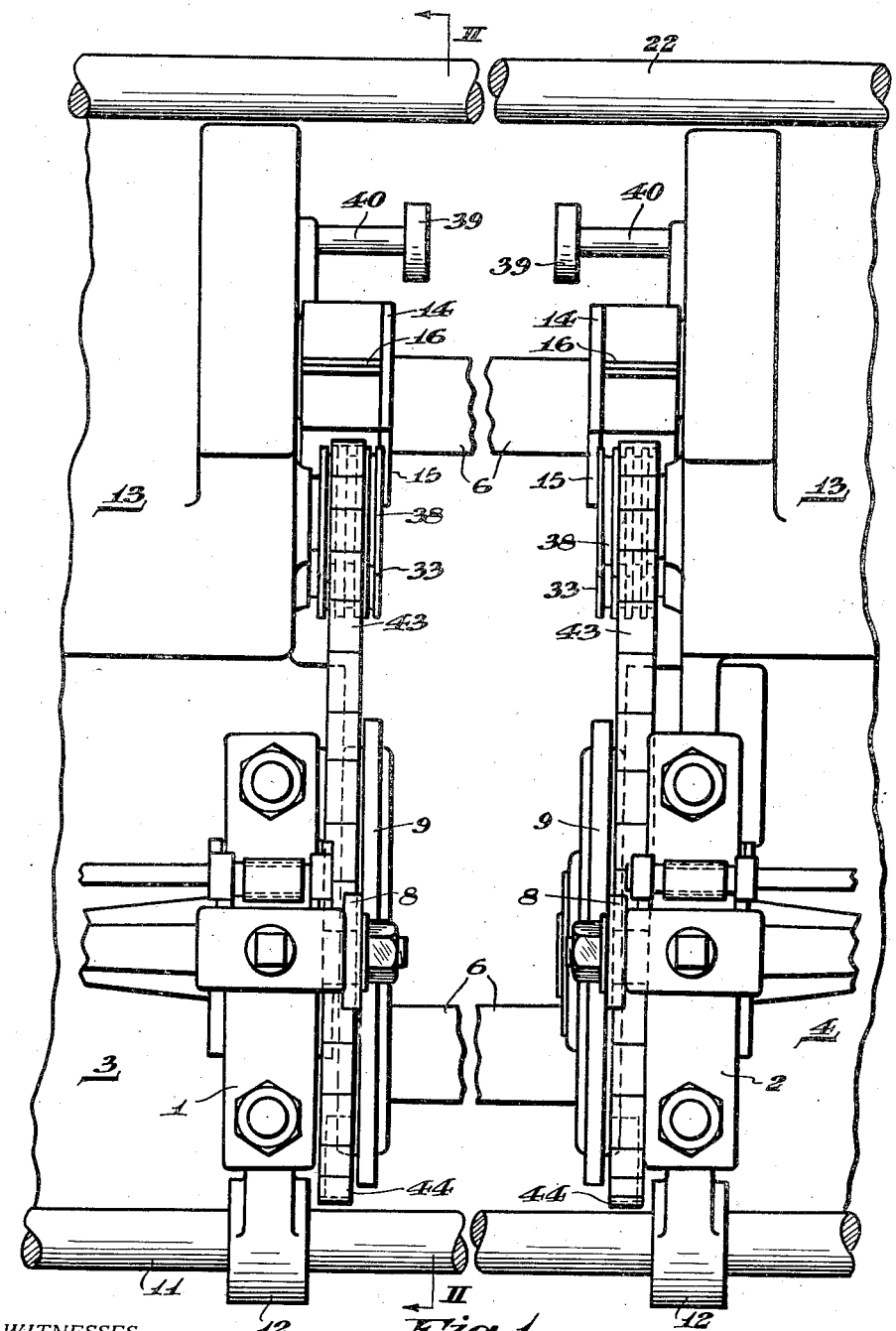

Oct. 18, 1938.　　　　G. P. THOMAS　　　　2,133,595
SIDE TRIMMING AND SCRAP CUTTING APPARATUS
Filed Oct. 15, 1937　　　3 Sheets-Sheet 1

WITNESSES:
E. J. Maloney
E. O. Johns

INVENTOR.
George P. Thomas
BY Brown, Critchlow & Flick
his ATTORNEYS

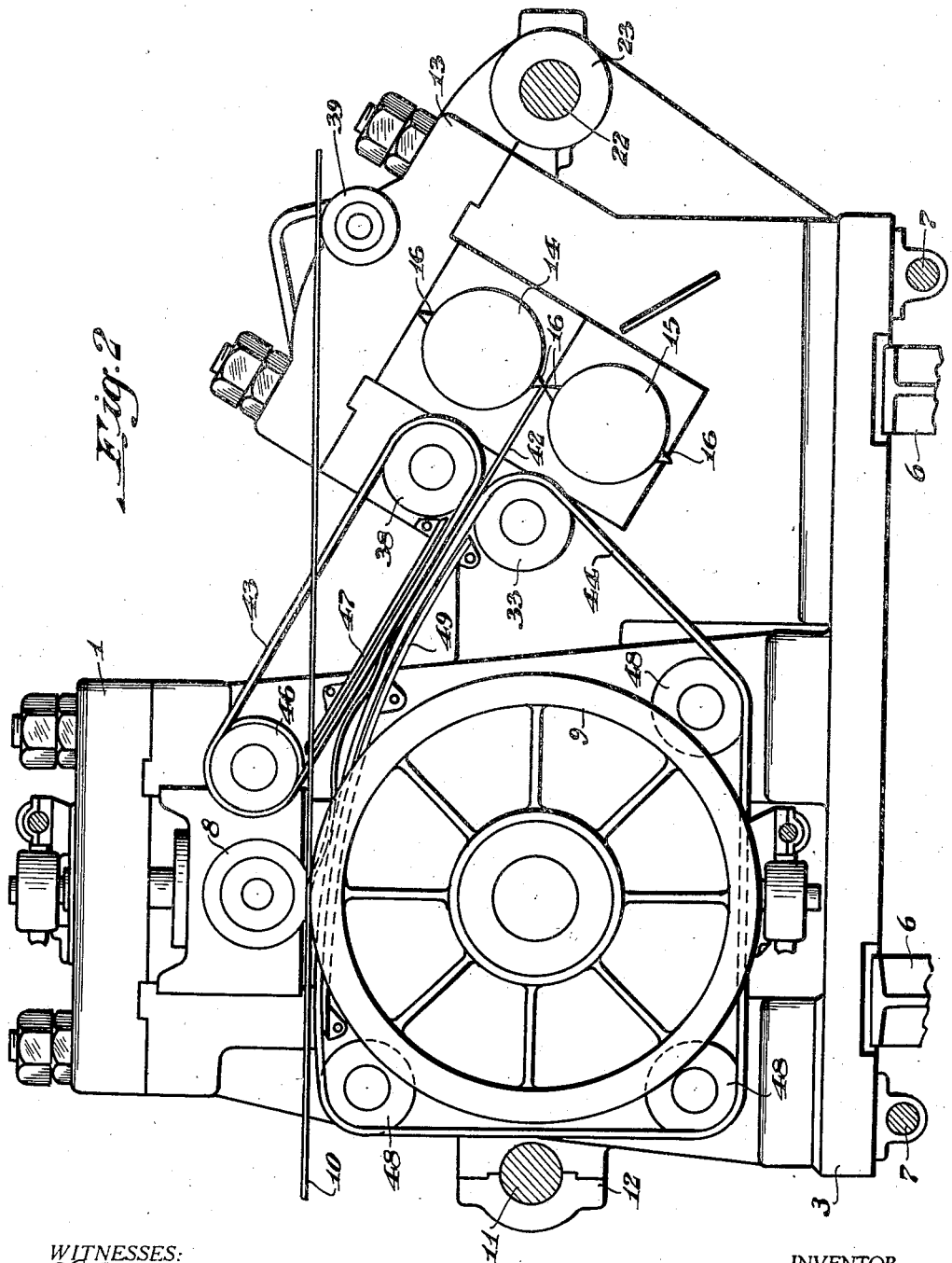

Oct. 18, 1938.   G. P. THOMAS   2,133,595
SIDE TRIMMING AND SCRAP CUTTING APPARATUS
Filed Oct. 15, 1937   3 Sheets-Sheet 3

WITNESSES:
E. J. Maloney
E. O. Johns

INVENTOR.
George P. Thomas
BY Brown, Critchlow & Flick
his ATTORNEYS.

Patented Oct. 18, 1938

2,133,595

UNITED STATES PATENT OFFICE 2,133,595

SIDE TRIMMING AND SCRAP CUTTING APPARATUS

George P. Thomas, Glenshaw, Pa.

Application October 15, 1937, Serial No. 169,130

14 Claims. (Cl. 164—10.6)

This invention relates to apparatus for continuously trimming the edges of sheets, plates and strip, hereinafter referred to collectively as "sheets," and for cutting the edge scrap thus formed into short lengths that can be disposed of conveniently.

In one type of apparatus for this purpose, such as that shown in Patent No. 1,819,635 to Biggert and Johnson, rotary trimming blades are mounted on horizontal axes in housings that are movable toward and away from each other for receiving sheets of different widths. The blades are so positioned that as a sheet travels forward between the two housings the blades trim a ribbon of scrap from each edge of the strip. Each set of blades generally consists of a large lower blade in the form of a wheel carrying an annular knife on which the sheet is supported as it passes between the housings, and a relatively small upper blade of similar construction offset outwardly of the lower blade so that its inner edge cooperates with the outer edge of the lower blade in trimming the edge of the sheet. It is also customary, as shown in Patent No. 2,014,248 to Evans, to locate the scrap shear or chopper below the plane of the sheet, and to deflect the scrap downwardly into the chopper by means of a downwardly inclined plate or chute. However, scrap deflecting and guiding means of this character have not proven to be satisfactory, especially when used with metal sheets, because as the scrap is formed it tends to curl and buckle which interferes with its passage to the scrap chopper. When a chute is used the scrap often jams therein and thereby makes it necessary to shut down the machine until the scrap can be straightened out and removed from the chute.

It is among the objects of this invention to provide apparatus of the type just referred to in which scrap is delivered from the edge trimmer to the scrap chopper in substantially flat condition without sticking, jamming, buckling or otherwise getting out of line.

In accordance with this invention there is provided a machine for trimming scrap from the edges of sheets, and apparatus preferably located below the path of travel of the sheet for cutting the scrap into short lengths to facilitate handling. To deflect the scrap downwardly and feed it to the scrap chopper in such a manner that it will not jam or otherwise foul the machine, a conveyor is provided which is preferably endless and formed from upper and lower belts that engage the top and bottom of the scrap, respectively. These belts may be driven faster than the scrap is traveling so that there is a constant tendency to pull the scrap forward whereby it is not allowed to buckle or twist between the belts. The lower belt passes beneath the upper blade of the trimmer so that it supports the scrap from the moment that it is formed and insures its entering between the belts.

Figure 4:
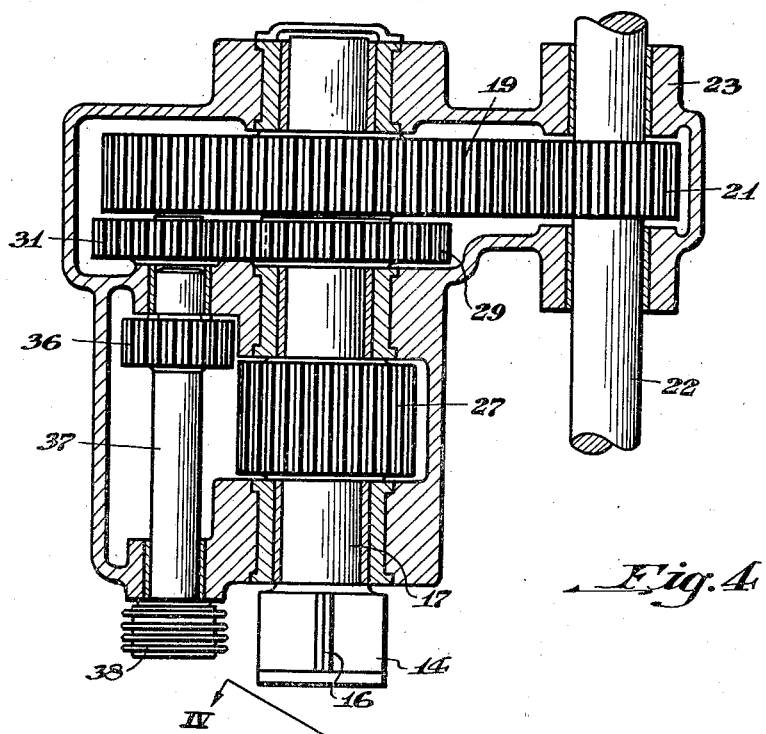
Figure 3:
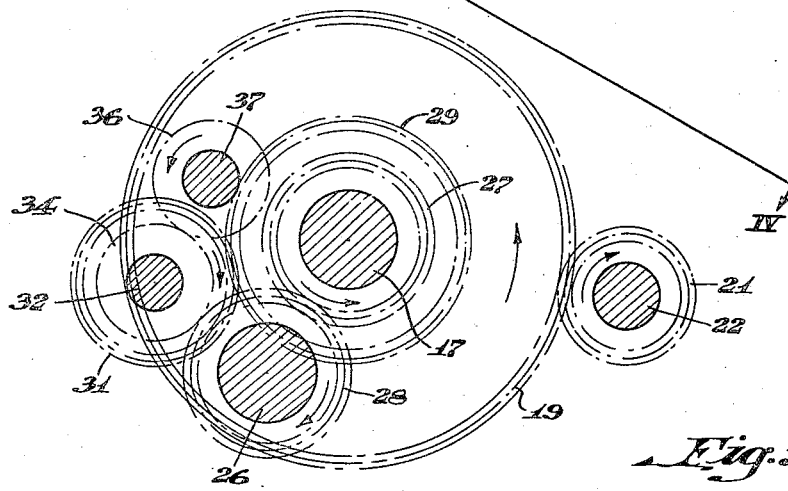

The preferred embodiment of the invention is illustrated in the accompanying drawings in which Fig. 1 is a fragmentary plan view of sheet trimming and scrap cutting apparatus with my scrap conveyor incorporated therein; Fig. 2 is a side view of one-half of the apparatus shown in Fig. 1 taken on the line II—II of that figure; Fig. 3 is a somewhat diagrammatic vertical section of the gear drive for the scrap conveyor and cutter; and Fig. 4 is a section through the upper part of one of the scrap cutter housings, taken in the direction indicated by line IV—IV of Fig. 3.

Referring to Figs. 1 and 2 of the drawings, parallel housings 1 and 2 are mounted on bed plates 3 and 4, respectively, at least one of which is movable toward and away from the other to vary the distance between the housings for accommodating sheets of different widths. The movable bed plate 2 slides on tracks 6 and may be adjusted therealong in any suitable manner, such as by adjusting screws 7 (Fig. 2) threaded in the bottom of the plate. Journaled in each of the housings is a pair of rotary side trimming shear blades, one mounted above the other. The upper blade 8 is preferably considerably smaller than the lower blade 9, and is offset outwardly relative thereto so that a sheet of metal 10 passing between the housings is supported by the lower blades as shown in Fig. 2. The inner edges of the upper blades cut against the outer edges of the lower blades and thereby trim a ribbon of scrap from each edge of the sheet. The blades are driven through suitable gearing (not shown) from a drive shaft 11 journaled in bearings 12 projecting from the rear of the housings. This general type of edge trimming apparatus is well known and need not be further described.

Mounted on the forward end of each bed plate is a housing 13 in which are journaled the drive shafts for the scrap cutters or choppers. These cutters are in the form of drums 14 and 15 mounted on the ends of the shafts, each drum being provided with one or more blades 16 mounted on the periphery thereof and extending axially of the drum. These scrap shears may be driven continuously in any suitable manner, a preferred way of doing this being shown in Figs. 3 and 4. As there shown, shaft 17 that carries the upper shear drum 14 is rotated by a gear 19 mounted thereon and meshing with a pinion 21 splined on a drive shaft 22 journaled in bearings 23 on the front of the scrap cutter housings. This drive shaft is preferably driven by the same means that drives the side trimming shear. The lower scrap shear drum 15, which is mounted on a shaft 26 (Fig. 3), is driven from shaft 17 by gears 27 and 28 mounted on those two shafts. For supporting sheet 10 above the scrap cutters, a pair of rollers 39 are journaled on shafts 40 projecting between housings 13 to which they are rigidly connected.

It is a feature of this invention that the ribbons of scrap 42, trimmed by rotary blades 8 and 9 from the opposite edges of sheet 10 passing between the two groups of housings, are guided to the scrap shears 16 in such a manner that there is no danger of the scrap buckling, twisting or otherwise fouling the machine and requiring it to be shut down. Accordingly, the deflecting means for guiding the scrap from the edge trimmer to the scrap shears is in the form of conveyors that actually convey the scrap to the scrap shears. As shown in Fig. 2, each conveyor is preferably in the form of upper and lower endless traveling belts 43 and 44 that are adapted to engage the top and bottom of the scrap, respectively. Most suitably, the belts are of the roller chain type because they wear longer as there is less friction with them.

The front portions of each set of belts are trained around upper and lower pulleys 38 and 33 disposed between the scrap shears and the edge trimming apparatus, as shown in Fig. 2. Lower pulley 33 is mounted on the end of a shaft 32 (Fig. 3) journaled in scrap shear housing 13. This shaft carries a pinion 31 that is driven by a gear 29 mounted on upper shear shaft 17. Also mounted on shaft 32 is a gear 34 that drives a similar gear 36 mounted on a shaft 37 above it that carries the upper pulley 38 on its outer end, as shown in Fig. 4. Consequently, these two pulleys and the two scrap shears are all driven from shaft 22 in the direction of the arrows in Fig. 3.

The rear end of upper belt 43 extends around a pulley 46 journalled in the edge trimming housing 1 above sheet 10 in front of upper blade 8. As the front pulley 38 is below the sheet, the belt is inclined downwardly toward the scrap shear so as to deflect the scrap downwardly. The lower strand of the upper belt may be backed up by a plate 47 which prevents the strand from being bowed in between the two pulleys by the scrap.

It is desirable that the scrap be supported by the lower belt 44 as soon as it is formed so that it will be sure to enter between the upper and lower belts. For this purpose the lower belt should pass below the upper blade, but there is no room at this point between the lower blade and the adjoining housing for a pulley, so the belt is carried entirely around the lower blade on pulleys 48 journaled in the edge trimming housing beyond the periphery of the blade, as shown in Fig. 2. Of course, the belt also passes around lower pulley 33 journaled in the scrap shear housing. The upper strand of this belt is supported and given the proper contour by a backing plate 49. A substantial portion of the adjacent strands of the upper and lower belts are so close together that the scrap ribbon can not twist between them, and therefore must be delivered substantially flat to the scrap shears.

In operation a sheet to be trimmed is fed between the two sets of housings after they have been adjusted toward or away from each other the distance necessary to accommodate the sheet. The sheet is supported near its edges by the large rotary lower blades 9, and as it moves forward a ribbon of scrap is cut from each edge of the sheet between the upper and lower rotary blades. As soon as a scrap ribbon starts to be formed it is supported by the underlying belt 44 that is continuously moving forward. If the scrap attempts to curl up it soon strikes the upper belt 43 which deflects it downwardly. Due to these traveling belts the scrap is positively carried forward and downward toward the scrap shears 16. As the belts are the surfaces which the scrap engages, it can not jam and curl up because those surfaces are constantly moving forward. This is especially true if the belts are driven faster than the scrap travels, for then the belts tend to draw the scrap ahead. The scrap is prevented from twisting between the belts, both by their forward movement and the narrow space between them for a considerable portion of their operative length. Consequently the scrap is fed to the scrap shears in substantially flat condition, and there is practically no danger of it fouling the machine.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. The combination with a machine for trimming scrap from the edge of a sheet, of means for cutting said scrap into short lengths, a conveyor extending from a point adjacent the place at which said edge trimming occurs to a point adjacent the scrap cutting means for guiding the scrap to said cutting means, and means driving the conveyor to thereby carry said scrap to the cutting means.

2. The combination with a machine for trimming scrap from the edge of a sheet, of means offset vertically from the path of said sheet for cutting said scrap into short lengths, an inclined conveyor for deflecting the scrap from said path and guiding it to said cutting means, and means driving the inclined conveyor.

3. The combination with a machine for trimming scrap from the edge of a sheet, of means for cutting said scrap into short lengths, an endless conveyor for guiding the scrap from the edge of the sheet to said cutting means, and means driving the conveyor.

4. The combination with a machine for trimming scrap from the edge of a sheet, of means for cutting said scrap into short lengths, a conveyor for guiding the scrap from the sheet to said cutting means, said conveyor comprising vertically spaced means adapted to be engaged by both the top and the bottom of said scrap extending from a point adjacent the place at which said edge trimming occurs to a point adjacent the scrap cutting means, and means driving said vertically spaced means.

5. The combination with a machine for trimming scrap from the edge of a sheet, of means for cutting said scrap into short lengths, a conveyor for guiding the scrap to said cutting means, and means for driving the conveyor at a higher speed than the forward speed of the scrap.

6. The combination with a machine for trimming scrap from the edge of a sheet, of means for cutting said scrap into short lengths, a conveyor for guiding the scrap from the edge of the sheet to said cutting means, and means driving the conveyor, said conveyor comprising an endless chain above the scrap and an endless chain below the scrap.

7. The combination with a machine for trimming scrap from the edge of a sheet, of means for cutting said scrap into short lengths, vertically spaced tracks disposed between said machine and cutting means and adapted to receive between them said scrap from the edge of the sheet being trimmed, an endless chain adapted to travel over the inner face of each track for aiding said scrap in its movement toward said cutting means, and means for driving the chains.

8. The combination with a machine for trimming scrap from the edge of a sheet, of means for cutting said scrap into short lengths, a conveyor for guiding the scrap from the sheet to said cutting means, said conveyor comprising means for deflecting the scrap downwardly, means for supporting the scrap, and means driving said deflecting means in the direction of movement of the scrap.

9. The combination with a machine for trimming scrap from the edge of a sheet, of means for cutting said scrap into short lengths, a conveyor for guiding the scrap from the sheet to said cutting means, said conveyor comprising means for deflecting the scrap downwardly, inclined means for supporting the downwardly deflected scrap, and means driving said inclined supporting means in the direction of movement of the scrap.

10. The combination with a machine for trimming scrap from the edge of a sheet, of means for cutting said scrap into short lengths, a conveyor extending from a point adjacent the place at which said edge trimming occurs to a point adjacent the scrap cutting means for guiding the scrap from the sheet to said cutting means, and means driving the conveyor, said conveyor comprising vertically spaced means spaced apart a distance less than the width of the scrap to hold the scrap against twisting.

11. The combination with a machine for trimming scrap from the edge of a sheet by means of a rotary blade above the sheet offset outwardly relative to a rotary blade below the sheet, of means for cutting said scrap into short lengths, and a conveyor for guiding the scrap from the sheet to said cutting means, said conveyor comprising an endless traveling belt passing below said upper blade for supporting said scrap as soon as it is trimmed from the sheet.

12. The combination with a machine for trimming scrap from the edge of a sheet by means of a rotary blade above the sheet offset outwardly relative to a rotary blade below the sheet, of means for cutting said scrap into short lengths, and a conveyor for guiding the scrap from the sheet to said cutting means, said conveyor comprising a track extending below said upper blade to a point adjacent said cutting means, an endless traveling chain moving over said track for supporting said scrap, a track disposed above said scrap and extending to a point adjacent said cutting means, and an endless traveling chain moving along the lower surface of the upper track.

13. The combination with a machine for trimming scrap from the edge of a sheet, of two pairs of rotary scrap cutters journaled below the path of travel of said sheet and adapted to cut said scrap into short lengths, a pair of sprockets journaled in front of each pair of cutters, sprockets journaled in said machine above and below said scrap, an endless chain meshing with the upper of said pair of sprockets and a sprocket in the machine above the scrap, an endless chain meshing with the lower of said pair of sprockets and a sprocket in the machine below the scrap, means for driving said cutters, and means operatively connecting the cutters with said pairs of sprockets for driving the chains to guide the scrap to the cutter.

14. The combination with a machine for trimming scrap from the edge of a sheet by means of rotary blades, of means for cutting the scrap into short lengths, and a conveyor for guiding scrap from the sheet to said cutting means, said conveyor comprising a carrier disposed below said rotary blades and extending to a point adjacent said scrap cutting means.

GEORGE P. THOMAS.